Patented Apr. 8, 1941

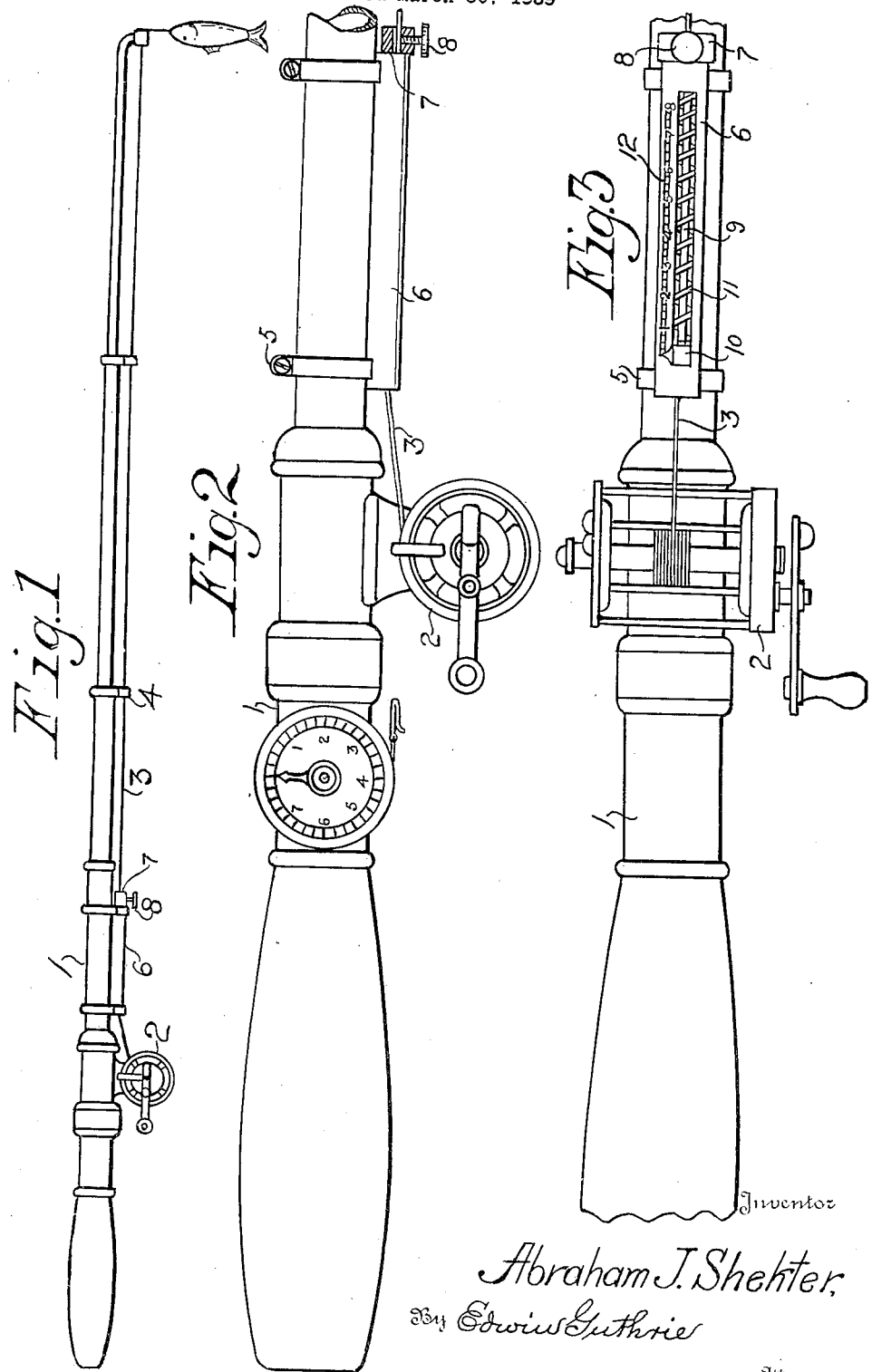

2,237,370

UNITED STATES PATENT OFFICE 2,237,370

FISH ROD SCALE

Abraham J. Shekter, Jamaica, N. Y.

Application March 30, 1939, Serial No. 265,063

1 Claim. (Cl. 265—63)

This invention relates to fish rod scales, more particularly it comprises in combination with the usual fish rod and reel, a scale having means for attaching the line to the scale in order that a fish caught upon the hook at the end of the line may be determined by the scale when the line is released by the reel.

Obviously, many forms of scale usable in the manner stated may be devised and applied, and it is not intended to limit this invention to the precise forms and arrangements of the parts disclosed in this application.

Of the accompanying drawing, Fig. 1 represents a fish rod having this invention applied and indicating the condition wherein a fish is suspended at the end of the line. All the parts of the invention are shown.

Fig. 2 is an enlarged side view of the handle portion of a fish rod, showing the reel and one position of the scale, with the clip for the line illustrated in section. A circular scale is also set out in this Fig. 2.

Fig. 3 is a view of the end portion of a fish rod as in Fig. 2, showing the reel, the line, a tubular or equivalent scale attached to the rod and through which the line passes. In this Fig. 3 is also set out the line clip for the scale, the indicating scale rod and the scale spring.

Throughout the drawing and description the same number is used to refer to the same part.

Considering the drawing, the rod 1 has attached thereto a reel 2 of any chosen mechanism whereon the line 3 may be wound and unwound in the customary manner. The rod may be in sections and have the section terminals 4 through which the line passes.

By means of ring clamps 5 there is attached to the rod a tubular scale 6, and at one end of the scale there is located a line clip 7 having a thumb screw 8 whereby the line may be attached to the indicating scale rod 9 which has at the end an indicating block 10 arranged to move along the scale in the operation and against the force of the spring 11 within the scale casing. The degree scale 12 may be divided into the fractions of a pound and numbered as shown.

It may be desirable to use a circular scale attached to the rod and having a cord provided with a spring clip whereby the line may be connected for carrying out the operation.

The operation is the same with any form of scale. When a fish is hooked, the reel is released after the line has been connected with the scale, and the weight of the suspended fish is readable upon the scale.

Having described this invention I claim:

A scale constructed to be secured upon a fish rod, said scale having a tubular body portion through which the fish line may be passed, the said scale having a spring and an indicating member adapted to be moved against the spring lengthwise of the scale, the said member having releasable means for securing the fish line to the end of the member whereby when the line is so secured the weight of a fish on the end of the line will be indicated.

ABRAHAM J. SHEKTER.